Oct. 11, 1966   W. A. SCHULZE ET AL   3,277,648
ROLL CONTROL DEVICE
Original Filed Jan. 28, 1963   4 Sheets-Sheet 1

William A. Schulze
Herbert W. Fuhrmann,
INVENTORS.

BY Edward J. Kelly
Herbert Berl
Jack V. Voigt

William A. Schulze
Herbert W. Fuhrmann,
INVENTORS.

Oct. 11, 1966       W. A. SCHULZE ET AL       3,277,648
                      ROLL CONTROL DEVICE
Original Filed Jan. 28, 1963                 4 Sheets-Sheet 3

William A. Schulze
Herbert W. Fuhrmann,
                    INVENTORS.
BY

Oct. 11, 1966       W. A. SCHULZE ET AL       3,277,648
                      ROLL CONTROL DEVICE
Original Filed Jan. 28, 1963                 4 Sheets-Sheet 4

William A. Schulze
Herbert W. Fuhrmann,
            INVENTORS.
BY  Edward J. Kelly
    Herbert Berl
    Jack W. Voigt

United States Patent Office 3,277,648
Patented Oct. 11, 1966

3,277,648
ROLL CONTROL DEVICE
William A. Schulze, 1303 Hermitage Ave. SE., and Herbert W. Fuhrmann, 5816 Criner Road SE., both of Huntsville, Ala.
Original application Jan. 28, 1963, Ser. No. 254,514. Divided and this application Dec. 21, 1965, Ser. No. 522,338
9 Claims. (Cl. 60—232)

The invention described herein may be manufactured and used by or for the Government for governmental purposes without the payment of any royalty thereon.

This application is a division of our application Serial No. 254,514, filed January 28, 1963.

This invention relates to a roll control system and, more particularly, to a roll control system for use with a missile. The device utilizes turbine exhaust gas formerly not utilized, and a directional, selectively movable, exit nozzle to change the direction of thrust and effectively alter the attitude of flight or roll of a missle or similar craft.

Prior means, for altering the direction of flight or roll in missiles, used an independent fluid pressure system exhausted to the atmosphere through a fixed nozzle. Two obvious disadvantages of this system are: It provides only one direction of thrust, and requires a separate fluid pressure system solely for providing this thrust.

In many liquid fuel missile systems, fuel and oxidizers are forced under pressure into the combustion chamber by means of a turbine-driven pump with the turbine being driven by gas generated within the missle. This gas is generated through a chemical process such as the decomposition of $H_2O_2$ into the super heated steam and oxygen. The present invention provides roll control by utilizing this source of gas pressure, already inherent to the missile system, by releasing this gas through a controlled nozzle exterior to the craft, thus providing effective control of the craft without addition of a second gas pressure system.

An object of the present invention is to reduce the size and weight of present missile systems by utilizing the turbine exhaust gases for control purposes, thus eliminating need for a separate source of gas pressure.

Another object of the present invention is to provide an adjustable, roll control nozzle for changing the direction of thrust.

A further object of this invention is to provide a roll control system adaptable to nozzle assemblies for varied control requirements and uses.

Still a further object of this invention is to provide an effective roll control device which is simple and inexpensive in construction yet reliable in operation.

The foregoing and other objects of this invention will become more fully apparent from the following description taken in conjunction with the accompanying drawings in which.

Figure 1:
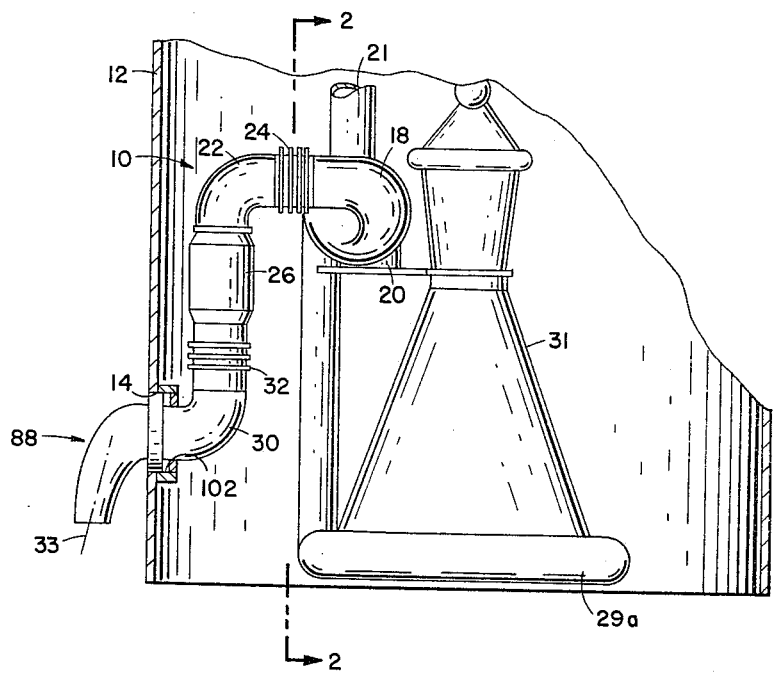
FIGURE 1 is a cut away assembly view showing the present invention in relation to the missile body, the turbine, and the main missile engine, details of the nozzle assembly being omitted for clarity.

As shown in FIGURE 1, the exhaust gas from a turbine 20, which drives a fuel pump 25 (FIGURE 2), is directed through a hollow interior conduit generally indicated by reference numeral 10, to wall 12 of the missile. Wall 12 is provided with an opening at a joint 14 to allow unobstructed continuous flow of gas through wall 12 and into an exteriorly mounted discharge nozzle 88.

Conduit 10 comprises two elbow sections 22 and 30 with a heat exchanger 26 interposed therebetween. Section 22 is connected to the exhaust section 18 of turbine 20 by a vibration eliminating coupling 24. A similar vibration eliminating coupling 32 connects heat exchanger 26 to section 30. Discharge nozzle 88 is connected to section 30 of conduit 10 by joint 14 at missile wall 12. The function of heat exchanger 26 is to heat cryogenics, such as liquid oxygen passed therethrough, thereby vaporizing the oxygen which may be utilized for applying gaseous pressure to the fuel tanks or other missile systems.

Figure 2:
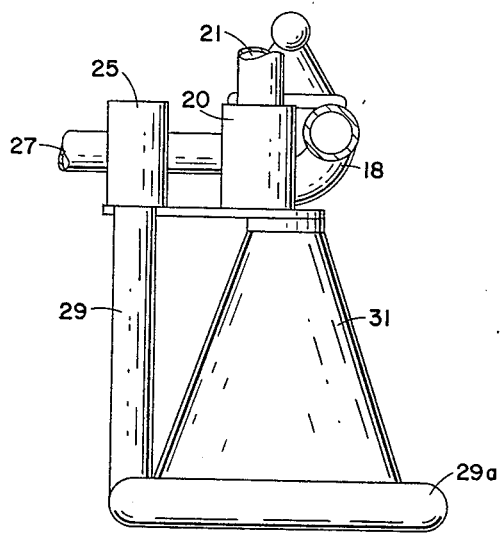
FIGURE 2 is a sectional view of the present invention taken on line 2—2 of FIGURE 1.

As shown in FIGURE 2, turbine 20 includes an inlet 21, connected to a steam source (not shown) within the missile, and an exhaust section 18 which exhausts gas into duct 10. The turbine drives a pump 25 which includes an inlet 27 and an outlet 29. Outlet 29 of pump 25 is connected to a circular manifold 29a about the exit portion of the nozzle affixed to main motor 31. Fuel is pumped through this manifold and through passageways in the nozzle wall (not shown) to cool the engine.

The disposition of discharge nozzle 88 with respect to the missile body is such that its axis, represented by line 33 (FIGURE 1), passes through the center of gravity of the missile when the nozzle is in its nondeflected or neutral position, thus the thrust of nozzle 88 does not introduce any yaw to the missile. As the propellants in the missile are expended during flight, the center of gravity will change slightly. The slight misalignment of the nozzle under this condition is compensated for by the gimbal action of the main motor. Roll control systems, utilizing two or more nozzles at equally spaced points on the periphery of the missile, may also be used. Since these nozzles would automatically compensate each other, the need for compensation by the main motor would be eliminated.

Figure 4:
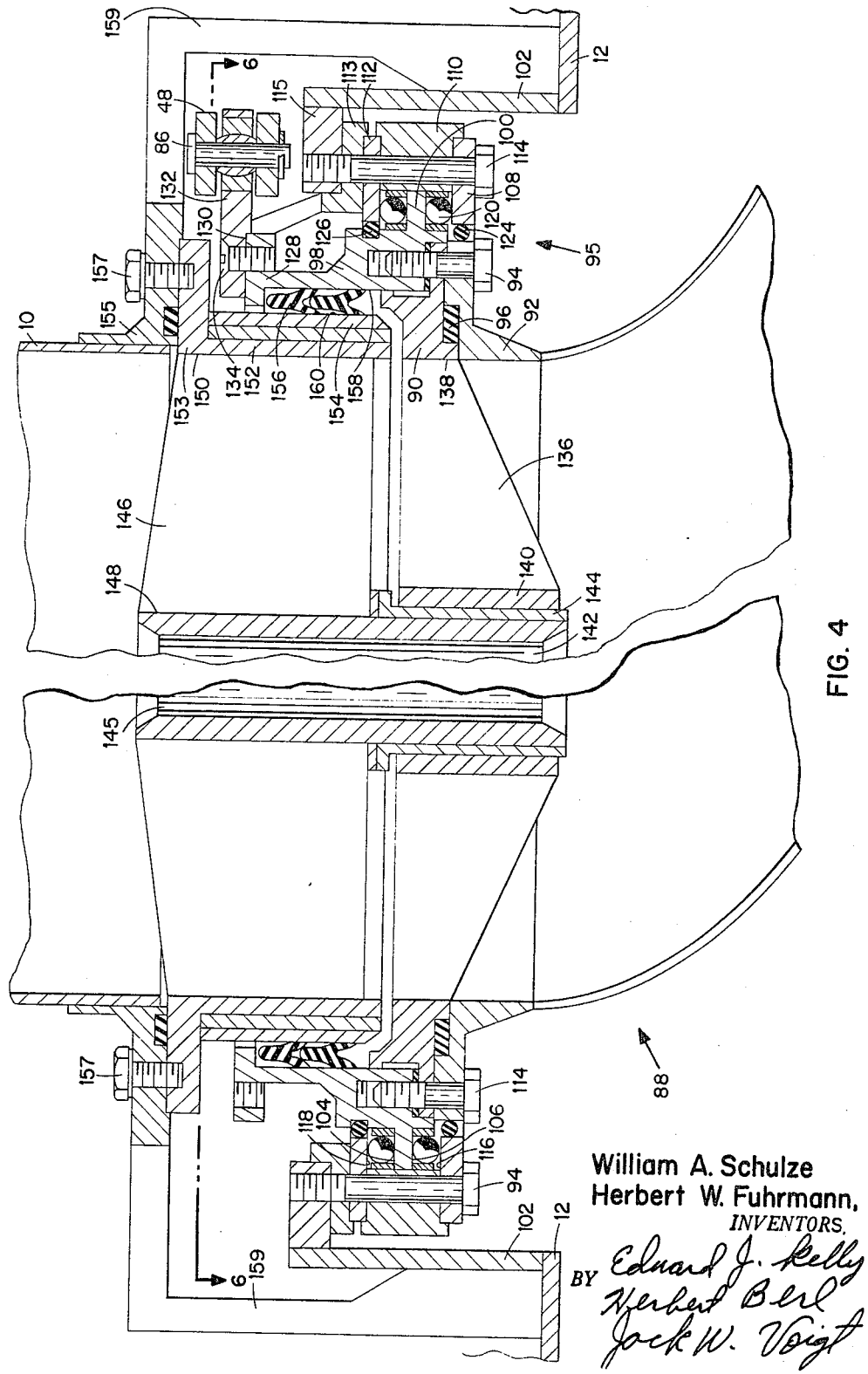
FIGURE 4 is a sectional view of the roll control device for the present invention.

As shown in FIGURE 4 the roll control device includes nozzle 88 comprising a circumferential support ring 90 rigidly and sealably attached to a ring portion 92 of the nozzle by a bolt 94 which projects through both elements. Support ring 90 is sealed to ring portion 92 of the nozzle by a circular ring washer 96. Bolt 94 is threaded into a rotatable circumferential element 98 of bearing assembly 95. Element 98 is provided with a circumferential flange 100 which projects toward an inset boss 102. Boss 102 projects inward from missile wall 12 and is attached to the wall as shown in FIGURES 1 and 4. Bearing assembly 95 comprises a plurality of balls 120, disposed in two circumferential rings between opposed surfaces 106 and 116, and opposed surfaces 104 and 118. Surfaces 104 and 106 are on opposite sides of flange 100, and surfaces 116 and 118 are the inner surfaces, respectively, of two washers 108 and 112. Washers 108 and 112 are provided with a spacer ring 110 and are held rigidly to a flange 115 on boss 102 by a threaded bolt 114. Bolt 114 passes through washers 108 and 112, ring 110, and a further spacing washer 113, and is threaded to flange 115.

Balls 120 are sealed by a pair of Q-rings 124 and 126 which are inserted between washer 112 and rotatable circumferential element 98, and between washer 108 and nozzle portion 92, respectively.

An upper I-shaped portion 128 of element 98 provides a mounting surface 130 to which an arm 132 is firmly affixed by a bolt 134. Arm 132 is actuated by a nozzle actuating assembly in a manner explained hereinbelow for directional control of the nozzle.

Additional support for nozzle 88 is provided by a plurality of radially extending ribs 136 which project internally from ring 90 and are attached at their inner ends to a sleeve 140. Sleeve 140 is rotatably supported by a shaft 142. A circumferentially disposed bearing 144 is mounted between shaft 142 and sleeve 140. Shaft 142, is in turn, rigidly supported at its inner end 145 by a plurality of radially extending ribs 146. Ribs 146 are rigidly attached at their inner ends 148 to shaft 142 and at their outer ends 150 to a mounting sleeve 152. Mounting sleeve 152 serves to connect nozzle 88 to conduit 10 and is provided with a peripheral flange 153 connected by a bolt 157 to a circumferential flange 155 affixed to the previously described conduit 10. Additional L-shaped braces 159 are provided to support flange 155 and the mounting sleeve 152. These braces are affixed at one of their ends to element 155 and at their other ends to boss 102 and missile wall 12 as shown in FIGURE 4.

A pair of Teflon seals 156 are interposed between the inner surface 158 of element 98 and an outer surface 160 of a bushing 154 fixed to mounting sleeve 152 to prevent leakage of the gases passing through the nozzle.

Figure 3:
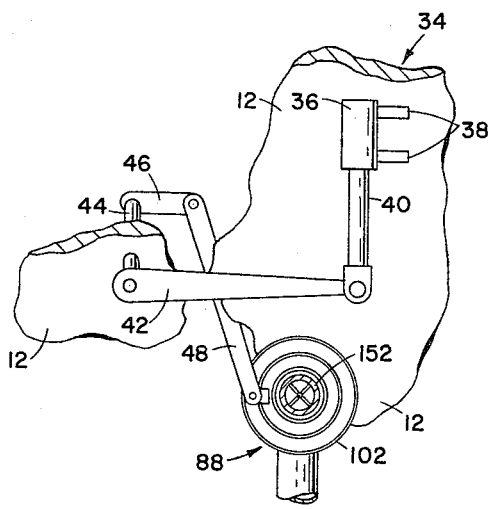
FIGURE 3 is a perspective view of the control linkage for moving the nozzle of the present invention.

Directional control of nozzle 88 is provided by a nozzle actuating assembly 34, FIGURE 3, which comprises a double acting hydraulic cylinder 36 connected to two conduits 38. A rod 40 is connected at one of its ends to a piston slidably mounted in cylinder 36. A control arm 42 is pivotally connected to the other end of rod 40. Arm 42 is fixed to shaft 44 journalled to, and extending through, a bracket 13 secured to missile wall 12. A second control arm 46 is firmly affixed to an outer end of shaft 44, and a rod 48 connects arm 46 to the distal end of arm 132. A pin 86 serves to provide a pivotal connection between arm 48 and arm 132.

To displace the nozzle, rod 40 is hydraulically actuated by the piston in cylinder 36, thereby transmitting motion through arm 42, shaft 44, arm 46 and rod 48. Ultimately, through this linkage, motion is transmitted to arm 132 which effects movement of nozzle 88.

The nozzle may be removed from the missile body during shipping by simply detaching bolts 94 without disturbing the structure of bearing assembly 95.

Figure 5:
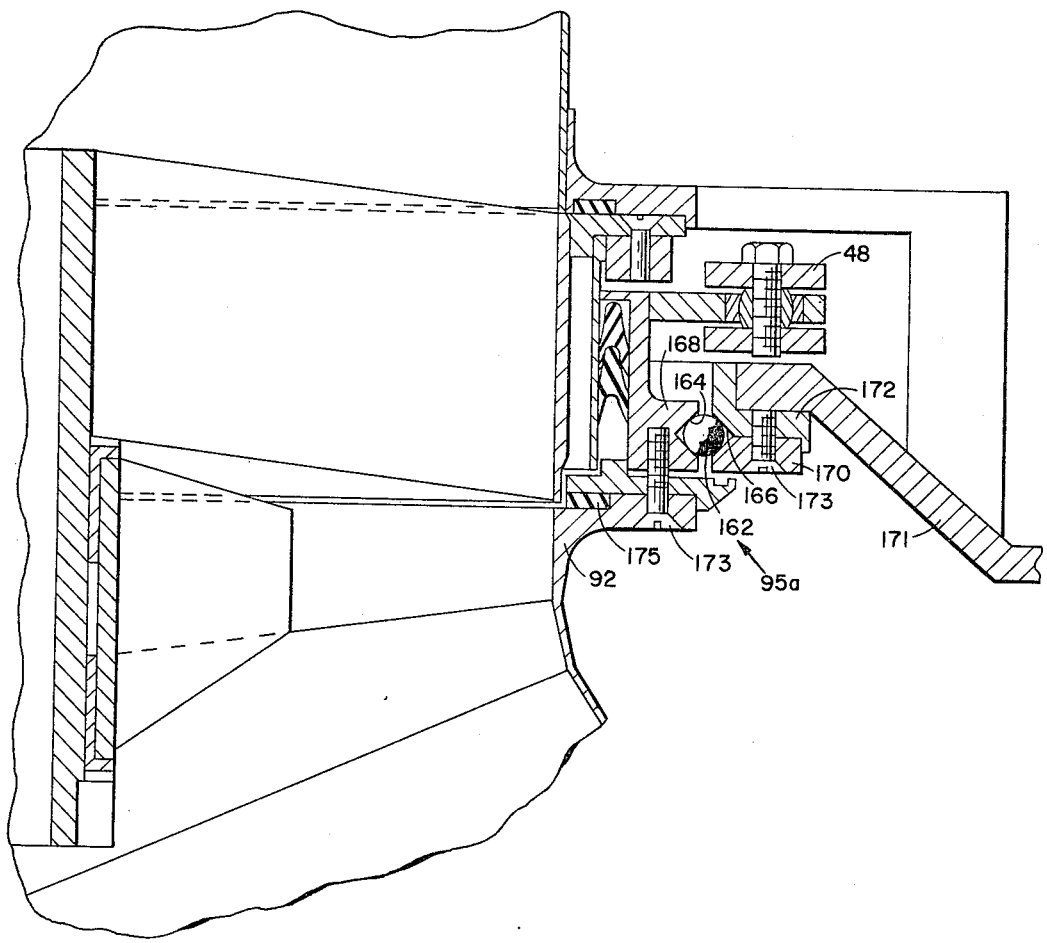
FIGURE 5 is a sectional view of another embodiment of the roll control device of the present invention.

Another embodiment of the present invention, illustrated in FIGURE 5, is substantially the same as the embodiment illustrated in FIGURE 4 except that the new embodiment includes a different form of ball bearing assembly 95a, which comprises a plurality of balls 162 disposed circumferentially about the nozzle in a single ring. Balls 162 are supported by opposing V-shaped notches or races 164 and 166 formed by a rotatable circumferential element 168 and elements 170 and 172, respectively, as shown in FIGURE 5. Bearing assembly 95a provides both horizontal and vertical support to the nozzle. As shown in FIGURE 5, a slightly different mounting arrangement on the missile wall 12 is used on this embodiment, which employs a truncated cone shaped bracket 171. Bearing assembly 95a is fixed to bracket 171 by a plurality of screws 173.

The nozzle in this embodiment may also be removed for shipping in a manner similar to that of the embodiment described in FIGURE 4, by removal of bolts 173 which hold ring portion 92 of the nozzle to rotatable element 168 of bearing 95a. The flexible and swivel nozzle embodiments of the present invention thus far described provide nozzle deflection up to substantially ±24 degrees each way from neutral.

Figure 6:
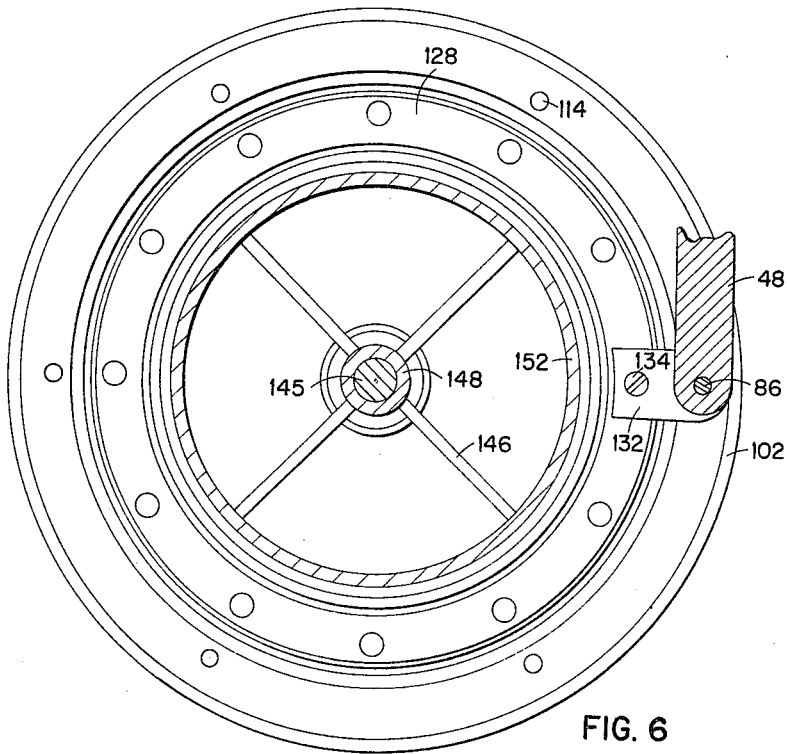
FIGURE 6 is a sectional view taken on line 6—6 of FIGURE 4.
Figure 7:
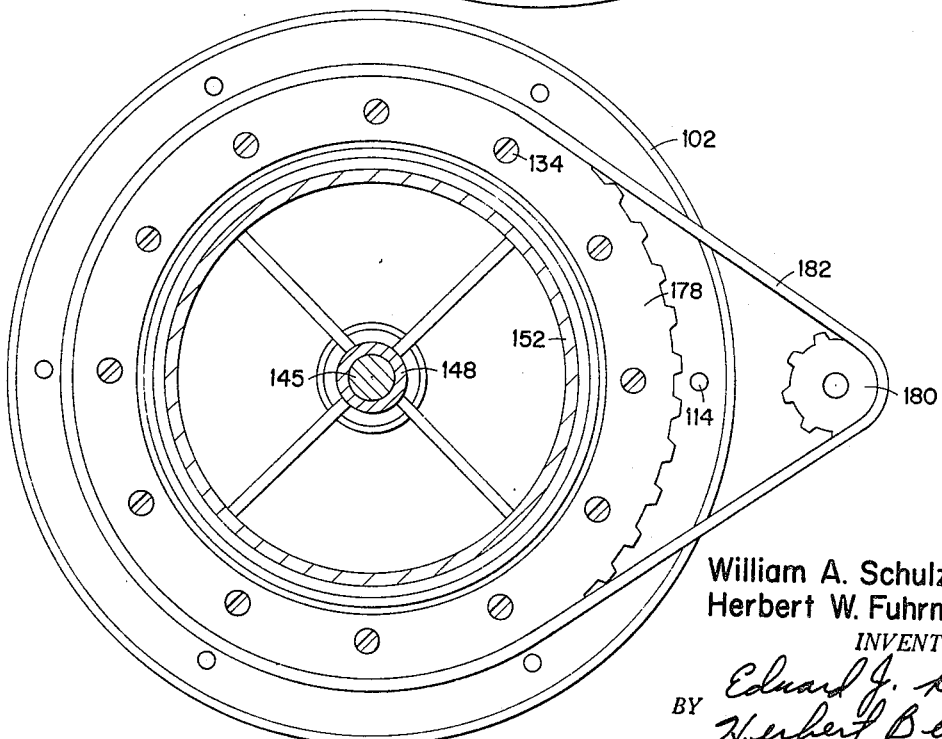
FIGURE 7 is a similar view to that shown in FIGURE 6 and illustrates a sprocket drive for changing the attitude of the nozzle.

In order to achieve a greater angle of rotation of the nozzle, up to a full 360 degrees of rotation, arm 132 (FIGURES 4 and 6) can be replaced by a sprocket 178, a drive sprocket 180 and a chain 182, respectively, as shown in FIGURE 7. Driving sprocket 180 provides rotation of sprocket 178 through chain 182. The driving assembly for sprocket 180 is not shown. Sprocket 178 can be secured to I-shaped portion 128 by bolts 134.

The chain driven sprocket, as described above, is adaptable for use with either the embodiment illustrated in FIGURE 4 or that illustrated in FIGURE 5.

It is to be understood that various modifications of the roll control system described herein can be made without changing the spirit and scope of the invention as claimed.

We claim:

1. In a missile having a turbine, a hollow exhaust duct connected to said turbine and to the external wall of said missile for discharge of turbine exhaust gases therethrough, a roll control device comprising: a rotatable auxiliary nozzle disposed transversely of and in fluid communication with said exhaust duct, means for mounting said nozzle in fluid communication with said exhaust duct comprising a shaft concentrically disposed within said exhaust duct and having a portion extending from said exhaust duct, a first plurality of ribs secured to said shaft and extending radially outwardly therefrom, means for securing said first plurality of radially extending ribs to said missile wall, means for rotatably securing said auxiliary nozzle disposed transversely of an in fluid duct including a bearing sleeve rotatably mounted on said portion of said shaft extending from said exhaust duct, a second plurality of ribs secured to said bearing sleeve and extending radially outwardly therefrom; a rotatable element secured to said nozzle and said second plurality of radially extending ribs for movement thereof, a control linkage secured to said rotatable element for rotational movement of said nozzle to control the direction of gas flow from said exhaust duct, and a bearing assembly secured to said missile wall for support of said rotatable element during rotation thereof.

2. A roll control device as set forth in claim 1, wherein said means for securing said first radially extending ribs to said missile includes a sleeve secured to the distal ends of said first radially extending ribs and provided with a flanged portion, a circumferential flange secured to said exhaust duct and said missile wall and means for securing said flange portion of said sleeve and said circumferential flange for concentric alignment of said shaft and said exhaust duct.

3. A roll control device as set forth in claim 2, wherein said nozzle is provided with an annular ring member secured thereto, said annular ring member being secured to the distal end of said plurality of radially extending ribs and said rotatable element for imparting rotational movement from said rotatable element to said nozzle.

4. A roll control device as in claim 3, wherein said bearing assembly includes a ring member secured to said missile wall, said rotatable element having an annular flange portion extending into said ring member, and a plurality of ball bearings carried in said ring member for support therein of said annular flange portion of said rotatable element.

5. A roll control device as set forth in claim 4 wherein said bearing assembly includes a plurality of stationary members secured to said missile wall and adjacent said rotatable member, said stationary members and said rotatable member provided with opposed V-shaped annular notches, and a single ring of balls mounted in said notches.

6. A roll control device as in claim 1, wherein said control linkage mechanism comprises a control arm affixed to said rotatable element and extending radially therefrom, and means for actuating said control arm to selectively position said nozzle.

7. A device as set forth in claim 1, wherein said control linkage mechanism comprises a sprocket affixed concentric with said nozzle, a driving sprocket mounted adjacent said sprocket, and a chain connecting said sprockets to provide selective positioning of said nozzle.

8. A roll control device as set forth in claim 5, wherein said control linkage mechanism comprises a control arm affixed to and radially extending from the periphery of said nozzle, and means for actuating said control arm to selectively position said nozzle.

9. A roll control device as set forth in claim 5, wherein said control linkage mechanism comprises a sprocket affixed concentric with said nozzle, a driving sprocket, mounted adjacent said sprocket, and a chain connecting said sprockets to provide selective positioning of said nozzle.

No references cited.

MARK NEWMAN, *Primary Examiner.*

C. R. CROYLE, *Assistant Examiner.*